May 12, 1925.                                              1,537,646
O. LUHR
ART OF MANUFACTURING ICE
Original Filed July 11, 1921    3 Sheets-Sheet 1
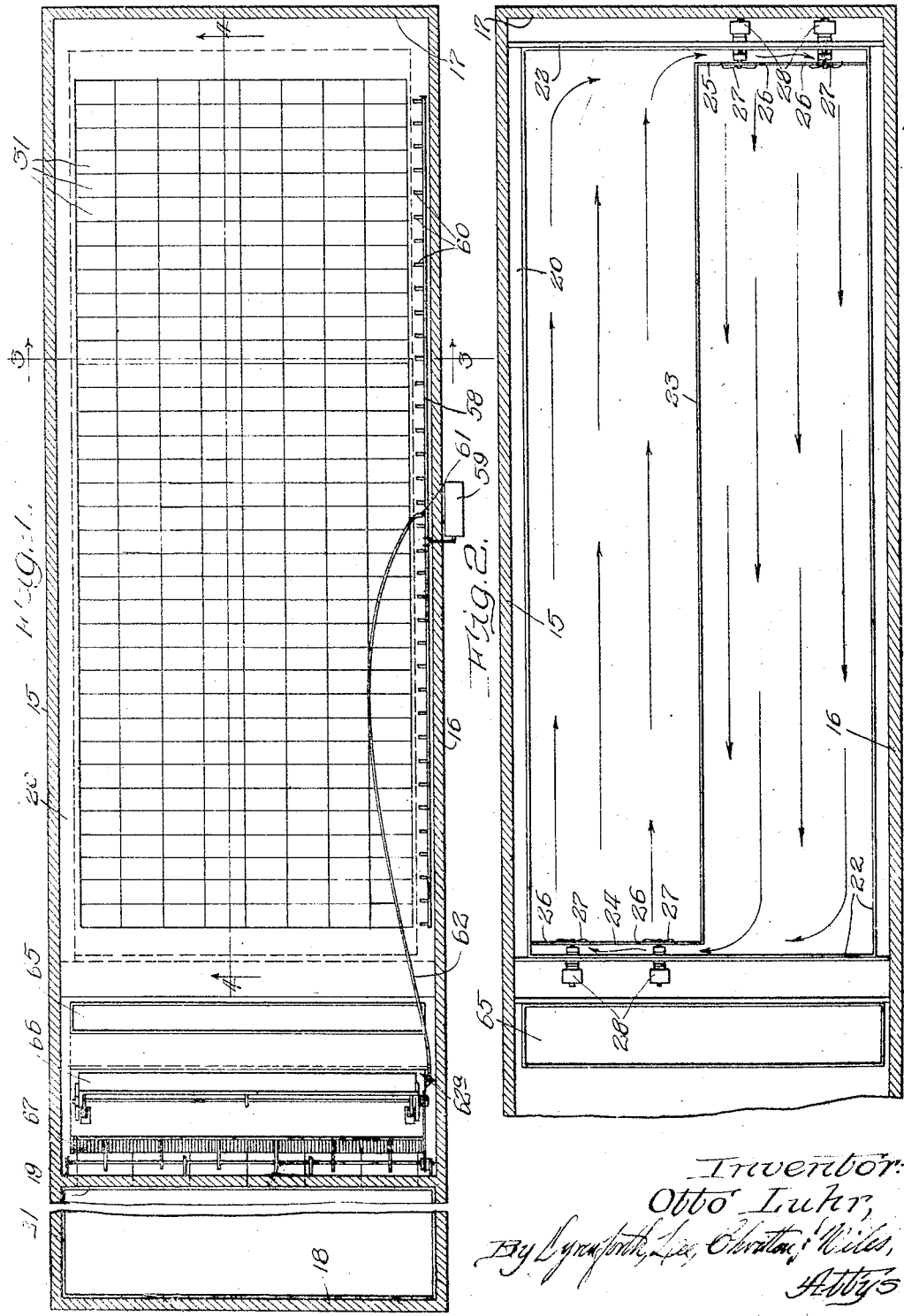
Inventor:
Otto Luhr,
By Lynnforth, Lee, Chritten & Wiles,
Attys May 12, 1925.  O. LUHR  1,537,646
ART OF MANUFACTURING ICE
Original Filed July 11, 1921   3 Sheets-Sheet 2
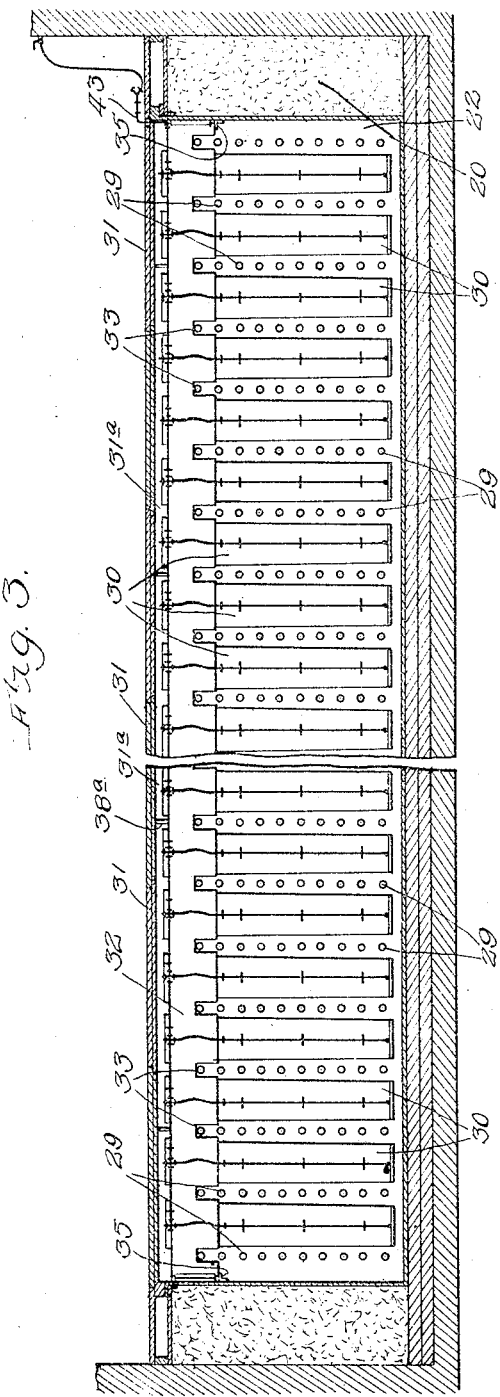

May 12, 1925.
O. LUHR
1,537,646
ART OF MANUFACTURING ICE
Original Filed July 11, 1921    3 Sheets-Sheet 3
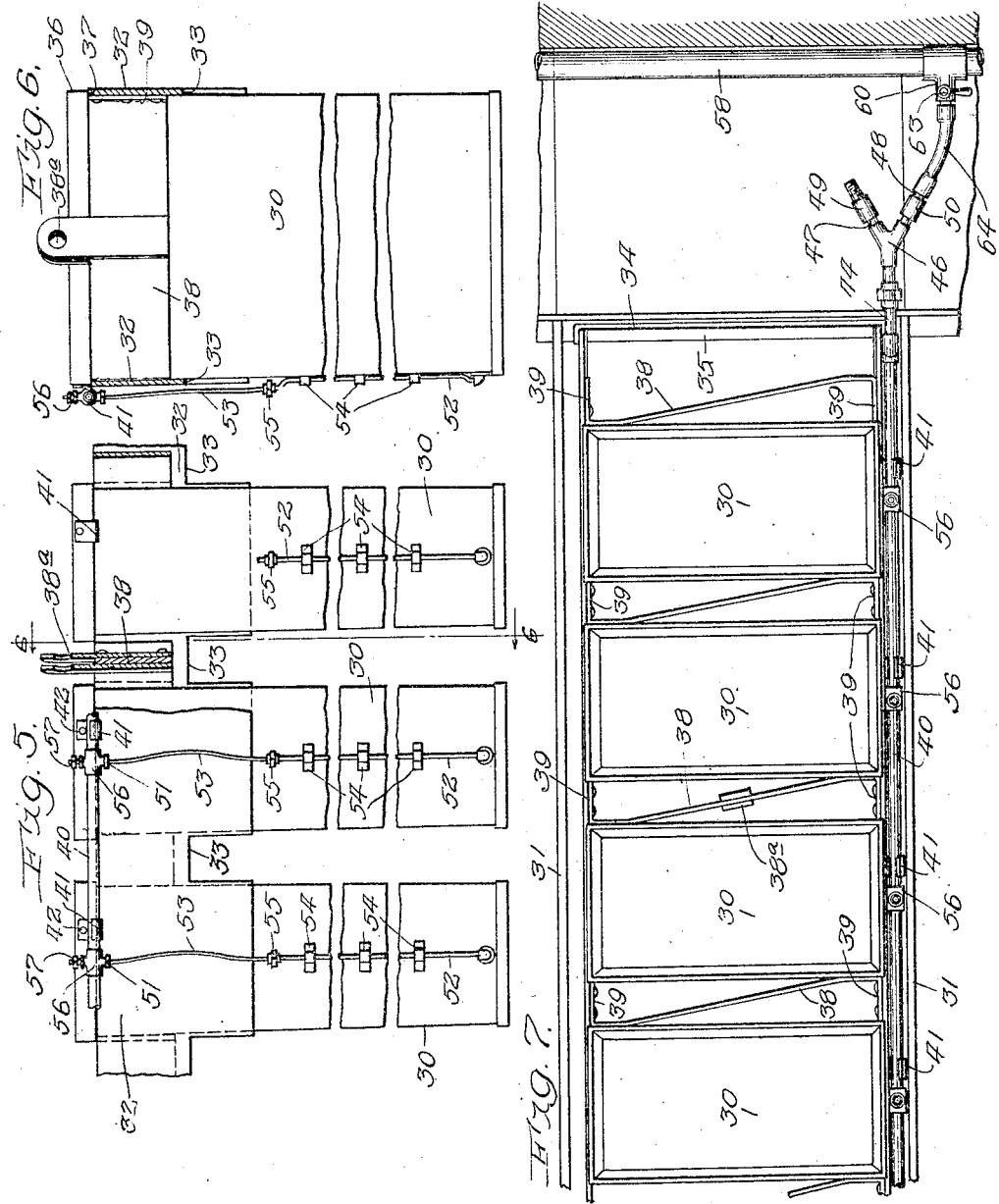
Inventor:
Otto Luhr,
By Dyrenforth, Lee, Chritton & Wiles,
Attys.

Patented May 12, 1925.

1,537,646

UNITED STATES PATENT OFFICE.

OTTO LUHR, OF CHICAGO, ILLINOIS, ASSIGNOR TO LUHR & FRIEDL, A PARTNERSHIP COMPOSED OF OTTO LUHR AND HERMAN FRIEDL, OF CHICAGO, ILLINOIS.

ART OF MANUFACTURING ICE.

Original application filed July 11, 1921, Serial No. 483,938. Divided and this application filed September 20, 1924. Serial No. 738,807.

*To all whom it may concern:*

Be it known that I, OTTO LUHR, a citizen of the United States, residing at Chicago, in the county of Cook and State of Illinois, have invented a new and useful Improvement in the Art of Manufacturing Ice, of which the following is a specification.

My invention relates, more particularly, to ice-making apparatus of the type employing a tank containing a fluid as, for example, brine, cooled by artificial refrigerating means, and cans for receiving the water to be frozen into cakes, extending into the brine, the cans being removable from the brine and transportable to a point of dumping, after which they are again charged with water and returned to place in the brine tank for freezing the contents of the cans, the cans being adapted for the introduction into the water of air for agitating the water; this application being a division of my application for United States Patent, Serial Number 483,938, filed July 11, 1921.

My primary object is to avoid the presence of moisture in the passages through which air is passed to the water in the cans, at the portions of these passages which are subject to a temperature sufficiently low to freeze water therein.

Referring to the accompanying drawings:

Figure 1 is a plan view, with certain parts broken away, of an ice-making apparatus suitable for practicing my improved method, the wall of the building in which the apparatus is housed being shown in section. Figure 2 is a similar view with substantially all of the apparatus removed and showing, in plan, the brine tank and circulating means therefor and also the dipping-tank. Figure 3 is a broken, enlarged, section taken at the line 3—3 on Fig. 1 and viewed in the direction of the arrows. Figure 4 is a broken, enlarged, section taken at the line 4—4 on Fig. 1 and viewed in the direction of the arrows. Figure 5 is an enlarged, broken, view in elevation, with certain parts sectioned, of one of the similar batteries of cans employed. Figure 6 is a section taken at the line 6—6 on Fig. 5 and viewed in the direction of the arrows; and Figure 7, an enlarged, broken, plan view of a portion of one of the similar batteries of cans showing it as located in the brine tank, and the air supply means for these cans connected with the air-line.

As is customary in ice-making plants, the apparatus is located in a building the walls of which are represented at 15, 16, 17 and 18, a transverse wall 19 dividing the space within the building into the two compartments 20 and 21, the compartment 20 containing, in the particular construction shown, substantially all of the ice-making apparatus, and the compartment 21 representing that portion of the building into which the ice is discharged preferably for transfer to another point.

The compartment 20 is provided with the brine-tank represented at 22, this tank, employed in apparatus of this general type, in accordance with common practice, containing a partition 23 extending lengthwise thereof and having angularly-disposed portions 24 and 25 spaced from the ends of the tank 22 with openings 26 in the walls 24 and 25 adjacent to which propellers 27, shown as operated by electric motors 28, are positioned, through which openings the brine is free to circulate under the action of the propellers, the arrangement shown permitting of the circulation of the brine as illustrated by the arrows in Fig. 2.

Further, in accordance with common practice, the brine tank 22 contains a series of parallel pipe coils which extend lengthwise of the tank 22 and are located a distance apart slightly greater than the width of the cans, hereinafter described at their narrowest dimension, this series of pipe coils being represented at 29. These pipe coils, which extend within a short distance of the top of the brine tank 22, are provided for the circulation therethrough of any suitable refrigerating medium, such as ammonia, supplied thereto in any suitable manner, as is common in constructions of this general character for maintaining the brine at the desired temperature for freezing the water in the cans hereinafter described.

The cans in which the ice is formed are represented at 30, these cans being provided in a series of rows, the rows extending crosswise of the length of the compartment 20, it being preferred that each row comprise twenty-four of the cans 30, these cans extending into the brine in the tank 22 located, respectively, in the spaces provided between the pipe coils 29, as shown more particularly in Fig. 3, the arrangement shown also involving, as is common practice, the provision of covering means for the tank 22 formed of sections 31 arranged in a series of rows, as shown in Fig. 1, to permit of access to the interior of the brine tank at any point thereof without uncovering the remainder of the tank. The tank is shown as provided with a series of stringers 31ª arranged in parallel relation near the top thereof and serving as supports for the cover sections 31 in accordance with common practice.

In the particular arrangement shown the cans 30, forming each transverse row thereof, are so related to other parts, hereinafter described, that each row of cans constitutes a battery which may be removed from position in the brine tank and transferred to the thawing tank and thence to the dumping means as a unit, and returned as a unit to position in the brine tank, this being provided for in the particular construction shown by providing at each side of each transverse row of cans a bar 32 which extends crosswise of the tank 22 and of the pipes 29, these bars containing downwardly-opening notches 33 at which they straddle the upper portions of the refrigerating pipes 29 as illustrated in Fig. 3. Each pair of bars 32, for the transverse rows of cans, are connected together at their opposite ends by cross-bars 34, the bars 32 and 34 being preferably of such thickness, and sufficiently rigidly connected together, in any suitable manner, as to provide a rigid framework, through the medium of which the several batteries of cans referred to may be bodily lifted from the brine tank and returned thereto. The frameworks, cans, and other parts carried thereby, as hereinafter described, are preferably of such weight that when the cans are charged with water to be frozen therein for forming the cakes of ice, the cans will be submerged to the desired depth in the brine; and as a desirable means for positioning the cans in the brine at the desired depth the inwardly-projecting ledges 35 are provided on the side walls of the tank 22, these ledges being shown as comprising angle irons secured to the side walls and upon which the frameworks rest.

The cans 30, constructed preferably of relatively thin sheet metal in accordance with common practice, taper toward their lower ends as shown in Figs. 5 and 6, their upper edges being provided with reenforcing bands at their outer surfaces and represented at 36, these bands projecting outwardly from the cans and forming downwardly-facing shoulders surrounding the cans. The frameworks referred to and formed of bars 32 and 34, are also provided at intervals with cross-pieces 38 formed of substantially Z-shaped bars connected at their flanged ends 39 to the inner surfaces of the opposed bars 32 and so disposed that a plurality of openings through the frameworks are provided for the several cans 30, the cans being supported at opposite sides thereof at the shoulder portions 37, on the frameworks, as shown in Fig. 6. Certain of the bars 38 are provided with upwardly-extending eyes 38ª to serve as points of connection for the hooks provided on the depending elements of cranes commonly employed for conveying the cans in apparatus of this general character.

Each battery of cans is provided with a main air-pipe represented at 40 and shown as supported in stirrups 41 secured, as indicated at 42, to the upper edge portions of the cans, this pipe extending practically the entire length of the battery of cans and being formed at one end with an up-turned portion 43 adapted to extend upwardly through an opening in the cover portion of the tank 22, this up-turned portion having extending therefrom a substantially horizontal portion 44 containing a removable and replaceable screen, not shown, and terminating in a branch coupling 46 the branches of which connect with pipes 47 and 48 containing check valves which open toward the cans, the casings of these valves being represented at 49 and 50, respectively. The extremities of the pipes 47 and 48 are provided for connection with air-conducting pipes hereinafter referred to. The pipe 40 adjacent each can is equipped with a depending branch pipe 51, the lower end of which opens into the adjacent can 30 at a point closely adjacent to the bottom wall of the can. The pipes 51 are shown as each formed of two sections, a lower section 52 and an upper section 53, the section 52 being supported on the can through the medium of straps 54 secured thereto in any desirable manner, as for example by soldering them in position on the can, and the section 53 being preferably formed of radially deflectable material as, for example, copper, being connected at its lower end with the upper end of the pipe section 52 at a union 55 and at its upper end with the coupling 56 interposed in the pipe 40 and provided with a needle valve 57 of any suitable construction and through the medium of which communication between the pipe 40 and the pipe 51 may be controlled, to regulate the amount of air supplied to the pipe 51.

It may be here stated that the purpose of the air pipes referred to is to supply air to the interiors of the cans thereby to effect a degree of agitation of the water in the cans 30 sufficient to insure the production of clear ice, the air, for this purpose, in the particular construction illustrated, being supplied from an air-pipe 58 extending lengthwise of the compartment 20 and supplied with the desired amount of air pressure, as from a compressor of any desirable construction, represented at 59, the pipe 58 being provided at intervals along its length with branch pipes 60 corresponding in number with the number of transverse rows of cans 30, and also provided with a branch pipe 61 intermediate its ends equipped with a flexible hose connection 62 having a manually-controlled valve of any desirable construction, represented at 62a. The branch pipes 60 are each provided with a valve 63, these branches being provided for connection with the several pipes 40 at the portions 48 of the latter, as by means of flexible pipe connections, one of which is represented at 64. The flexible pipe 62 is provided for connection, successively with the portions 47 of the pipes 40, for a purpose hereinafter described.

The compartment 20 contains at one end thereof, the left hand end in Fig. 1, a thawing tank which is represented at 65, the top of this tank containing an opening through which the battery of cans is lowered, to cause the cans to extend into the thawing water contained in the tank and thereby break the bond between the ice cakes and the interior surfaces of the cans for the purpose of permitting of the discharge of the cakes of ice from the cans by gravity, as for example in the dumping operation hereinafter referred to.

Located beyond the dipping, or thawing, tank 65 is dumping mechanism adapted to receive the cans of ice, the cakes in which have been thawed therefrom, as stated, and move the cans to a position in which the cakes of ice may slide therefrom to a suitable point of discharge. Where means for this purpose are provided they may be of any desirable construction. Those shown comprise, generally stated, a tiltable holder 66 of angle-shape in cross-section adapted to receive the battery of cans and be tilted downwardly to the left in Fig. 1 to a position in which the cakes of ice in the battery of cans may slide therefrom by gravity to the left in Fig. 1 and through the closure-equipped opening 67 in the partition 19, the cakes of ice thus discharged passing into the compartment 21 from which they may be removed in any desirable way.

Any suitable means for charging the cans with water from which the ice is to be formed may be provided. So far as my present invention is concerned, these cans could be charged with the water from which the blocks of ice are to be formed, by filling the cans by hand or by any suitable filling apparatus such, for example, as is commonly in use and involving a series of water receptacles corresponding with the number of cans to be charged at a time with water, from which receptacles pipes extend into a position for discharging the water therefrom into the several cans, valve means being provided for controlling the discharge of the water into the cans, the arrangement being such that these water pipes extend into a position above the cans when positioned on the rocking holder and corresponding with the holder 66.

The operation of the apparatus is as follows. It may be stated as a premise to the description of the operation that the batteries of cans are withdrawn from the brine tank in succession, it being designed that one battery of cans be withdrawn from the brine tank, thence moved into the thawing tank, thence carried to the dumping holder for discharging the cakes of ice therefrom, the cans being charged with water at this point, following the dumping operation stated, and then returned to the brine tank, before any of the other rows of cans are disturbed, and after this operation has been completed the next row of cans are similarly operated on, and so on throughout the series of rows until all of the cans thereof have been emptied of the cakes of ice contained therein, and are charged with water and replaced in the brine tank, the laying out of an apparatus of this kind preferably contemplating continuous operation thereof upon the basis of the period required for forming the cakes of ice corresponding with the length of time required to accomplish the dumping and re-filling with water, of all of the rows of cans. The withdrawing of a battery of the cans is effected by engaging therewith, at the eyes 38a, the depending hoisting hook-equipped elements of the crane usually employed in ice-making installations and which would be located in the upper portion of the compartment 20 and be movable in the latter in a substantially horizontal plane, and in the operation of the crane to hoist the elements referred to, the can-supporting framework and with it the several cans forming the battery thereof supported by this frame work, would be elevated. The crane is then operated to carry the battery of cans to the thawing tank 65, the operator first having disconnected the pipe 40 from the pipe 58 at the section 54, the valve 63 having been previously closed and the flexible pipe 62 having been preliminarily attached to the portion 47 of the pipe 40 and its valve 62a opened. The battery of cans removed from the brine, as stated, is then positioned, by the crane, over the inlet of the tank 65 and lowered by the crane into a position wherein the thawing water in the tank extends above the cakes of ice in the cans but below the tops of the latter, the cans being permitted to remain in this tank until the ice has been sufficiently thawed to break the bond between the ice and the cans, whereupon the crane is again actuated to lift the battery of cans and position them on the holder 66, the holder occupying the position shown in Fig. 1. The hoisting hooks of the crane would then preferably be disengaged from the eyes 38ᵃ and the holder then rocked downwardly to the left in Fig. 1 to a position in which the cakes of ice may slide by gravity from the cans through the opening 67 in the partition 19. The holder is then returned to normal, upright, position in which the cans extend substantially upright. The operator then charges into the cans the desired amount of water for forming the ice cakes therein.

The battery of cans having been filled with water, the crane is again attached thereto and the battery of cans carried by the crane to the portion of the brine tank from which the cans were removed, and the cans then lowered to position in the brine. The main air-pipe 40 of this battery of cans is then connected at its portion 48 with the air-line pipe 58, by means of the adjacent coupling-pipe 64, the valve 63 thereof then opened, and thereafter the valve 62ᵃ closed and the pipe 62 disconnected from the pipe 40. The pipe 62 is then connected with the next row of cans in which the ice cakes are formed, the valve 62ᵃ opened, the hose 64 disconnected and the valve 63 closed, this battery of cans then lifted from the brine tank, carried to the thawing tank and thence to the holder 66 where they are dumped and afterwards re-filled with water, whereupon the charged cans are returned to position in the brine tank, the air-pipe 40 thereof connected with the adjacent hose section 64, the valve 63 therefor opened, the valve 62ᵃ closed and the pipe 62 disconnected from this pipe 40, all as particularly described in connection with the first row of cans operated on; and so on throughout the entire series of rows of cans, and by the time the last row of cans has been dumped and returned to the brine tank, charged with water, the first row of cans is ready to be again dumped and the operations stated are continued.

The purpose of supplying air to the cans as stated, whereby air is continuously supplied to the cans, is to insure against the flow of water into these air-pipes, it being understood that if moisture exists in these pipes, at the portions thereof subjected to the action of the brine, accumulations of ice will be formed therein either partly or wholly clogging these air-pipes against the passage of air therethrough. While the chance of water flowing into the air-pipes occurs only during certain stages in the operation, it is desirable, in order that the flow of air through these air-pipes and into the cans be insured during all stages in the operation in which the water would flow into the air-pipe if no air was flowing therethrough, that the supply of air to the air-pipes 40 be continuous, as stated, and by providing for the disestablishing of one air connection and the establishment of another air connection at substantially the same location in the apparatus, as stated, liklihood of a break in the continuity of air supplied to the cans, is negligible. Furthermore, the supplying of the air to the cans during the charging of the latter with water is an advantage, as thereby any stoppage in the air-pipes may be quickly determined and the blowing out of the accumulations in the pipes quickly effected, and where repairs are discovered to be necessary such may be expeditiously effected, as compared with the case where the cans have been introduced into the brine tank before the air connections are made which latter practice is the one now commonly followed.

While I have illustrated and described a particular apparatus for practicing my improved method, and have described the method as practiced in a certain particular way, I do not wish to be understood as intending to limit it thereto as the invention may be practiced by other apparatus and the method otherwise practiced, without departing from the spirit of my invention.

What I claim as new, and desire to secure by Letters Patent, is:

1. In the art of making ice in which the ice cakes are formed in movable cans having water-agitating air pipes carried thereby and which pipes open into the interiors of the cans and are subjected therewith to freezing temperature, the method of producing the ice cakes and preventing the closure of the pipes to the passage of air therethrough by the freezing of water in said pipes, which consists in subjecting the cans to a freezing temperature and supplying to the pipes air under such pressure and throughout such period that passages for the air through the pipes will be continuously maintained throughout the period said pipes are subjected to the freezing temperature while any part of the water remains unfrozen.

2. In the art of making ice in which the ice cakes are formed in movable cans having water-agitating air pipes carried thereby and which pipes open into the interiors of the cans and are subjected therewith to freezing temperature, the method of producing the ice cakes and preventing the closure of the pipes to the passage of air therethrough by the freezing of water in said pipes, which consists in subjecting the cans to a freezing temperature and supplying continuously to the pipes during their subjection to freezing temperature while any part of the water remains unfrozen, air under such pressure that air passages therethrough will be continuously maintained.

3. In the art of making ice in which the ice cakes are formed in movable cans having water-agitating air pipes carried thereby and which pipes open into the interiors of the cans and are subjected therewith to freezing temperature, the method of producing the ice cakes and preventing the closure of the pipes to the passage of air therethrough by the freezing of water in said pipes, which consists in subjecting the cans to a freezing temperature, supplying to the pipes throughout those periods during which water would flow into the pipes, air under such pressure that the water will not enter said pipes.

4. In the art of making ice in which the ice cakes are formed in cans movable into and out of a brine tank, the cans having water-agitating air pipes carried thereby and which pipes open into the interiors of the cans and are subjected therewith to freezing temperature, the method of producing the ice cakes and preventing closure of the pipes to the passage of air therethrough by the freezing of water in said pipes, which consists in supplying the cans with water, subjecting the cans to freezing temperature, and supplying continuously from the beginning of the water supplying operation to the conclusion of the freezing operation air at a pressure sufficient to prevent the entry of water into the pipes.

5. In the art of making ice in which the ice cakes are formed in cans movable into and out of a brine tank, the cans having water-agitating pipes carried thereby and which pipes open into the interiors of the cans and are subjected therewith to freezing temperature, the method of producing the ice cakes and preventing the closure of the pipes to the passage of air therethrough by the freezing of water in said pipes, which consists in supplying the cans with water, subjecting the cans to freezing temperature, and supplying air continuously during repeated complete operations of manufacturing ice cakes, at a pressure sufficient to prevent the entry of water into the pipes.

6. In the art of making ice in which the ice cakes are formed in cans movable into and out of a brine tank, the cans having water-agitating pipes carried thereby and which pipes open into the interiors of the cans and are subjected therewith to freezing temperature, the method of producing the ice cakes and preventing closure of the pipes to the passage of air therethrough by the freezing of water in said pipes, which consists in supplying the cans with water, when removed from the brine tank, subjecting the cans to freezing temperature, and supplying continuously, from the beginning of the water supply operation to the conclusion of the freezing operation, air at a pressure sufficient to prevent the entry of water into the pipes.

7. The method of manufacturing ice which consists in charging water into the can in which ice is to be formed, freezing the water therein, and thereafter dumping the ice cake from the can and recharging the can with water to be frozen to form another cake therein, and continuously supplying air under pressure to the interior of said can during all of said operations.

8. The method of manufacturing ice which consists in charging water into a can having an air passage and in which can the ice is to be formed, freezing the water therein, thawing the ice cake to break the bond between it and the can and thereafter dumping the ice cake from the can and recharging the can with water to be frozen to form another cake therein, and continuously supplying the water agitating air to the interior of said can during all of said operations, under such pressure as to prevent the entry of water into the air passage.

OTTO LUHR.